(12) United States Patent
Takada

(10) Patent No.: US 6,331,924 B1
(45) Date of Patent: Dec. 18, 2001

(54) MAGNETORESISTIVE HEAD USING A MAGNETORESISTIVE ELEMENT AS A MAGNETIC DETECTOR

(75) Inventor: Akio Takada, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/285,094

(22) Filed: Apr. 2, 1999

(30) Foreign Application Priority Data

Apr. 8, 1998 (JP) .................................................. 10-096458

(51) Int. Cl.[7] .............................. G11B 5/127; G11B 5/39
(52) U.S. Cl. .............................................. 360/323; 360/128
(58) Field of Search ...................................... 360/323, 128

(56) References Cited

U.S. PATENT DOCUMENTS 6,081,409 * 6/2000 Hughbanks et al. ................. 360/128

* cited by examiner

*Primary Examiner*—George J. Letscher
(74) *Attorney, Agent, or Firm*—Sonnenschein, Nath & Rosenthal

(57) ABSTRACT

An MR head using an MR element as a magnetic detector and having head elements formed on a substrate is provided which comprises a capacitor connected in parallel to the MR element. The substrate is made of a conductive material to serve as one of electrodes forming the capacitor. Owing to this construction, the MR element of the MR head is hardly broken down due to an ESD or EOS.

3 Claims, 10 Drawing Sheets

MAGNETORESISTIVE HEAD USING A MAGNETORESISTIVE ELEMENT AS A MAGNETIC DETECTOR

RELATED APPLICATION DATA

The present application claims priority to Japanese Application No. P10-096458 filed Apr. 8, 1998 which application is incorporated herein by reference to the extent permitted by law.

BACKGROUND OF THE INVENTION

1. Field of the Invention

The present invention relates to a magnetoresistive head comprising a magnetoresistive element to detect a magnetic field from a magnetic recording medium.

2. Description of Related Art

The magnetoresistive head (will be referred to as "MR head" hereinunder) using a magnetoresistive element (will be referred to as "MR element" hereinunder) to detect a magnetic field from a magnetic recording medium has been proved to have a problem that the MR element is broken down due to an electrostatic discharge (ESD) or electrical overstress (EOS), resulting in a deterioration of the MR head.

More particularly, an ESD or EOS causes an overcurrent which will flow to an MR element which will thus be damaged by a heat and magnetic field developed by the overcurrent.

It is considered that through a series of processes such as wafer forming, working, assembling, etc. to produce an MR head, an external electric charge flows into the MR head under production through the processes and causes an overcurrent to flow to an MR element of the MR head, the overcurrent causing to develop a heat and magnetic field which will damage the MR element directly or indirectly.

Note that in the wafer forming process, head elements forming together an MR head are formed on a wafer substrate. The working process is such that the wafer substrate on which the MR head elements have been formed is cut into individual MR head pieces and the MR head pieces are machined in a predetermined manner. In the assembling process, the MR head thus machined is mounted on a head base and terminals of the MR head are connected to predetermined wires, to thereby assemble a magnetic head unit comprising the MR head.

Further to the above consideration, the MR element is broken down in some cases due to ESD/EOS also after assembling the MR head in the magnetic head unit. More specifically, when the MR head is assembled in a hard disc drive, for example, an electric charge flows into the MR head from a magnetic disc, causing an overcurrent to flow to an ME element of the MR head, as the case may be. Such an overcurrent also will damage the MR element.

To prevent the MR element from being broken down due to ESD/EOS, it has been proposed to coat an ABS (air bearing surface) of the MR head with a DLC film (diamond-like carbon film) or with a metal film such as tungsten.

However, the coating of the ABS surface with the DLC or metal film cannot perfectly prevent the MR element from being broken down due to ESD/EOS.

After the MR head is assembled into a magnetic head unit, the coating of the ABS surface of the MR head is effective for prevention of the MR element from being broken down. However, because it is not possible to prevent the MR element from being broken down at an earlier stage, this coating is done at the: final stage of the MR head manufacturing process.

Further, the coating of the ABS surface with a metal film will cause-the read output to be lower since the metal film will short-circuit the MR element.

SUMMARY OF THE INVENTION

Accordingly, the present invention has an object to overcome the above-mentioned drawbacks of the prior art by providing an MR head comprising an MR element to detect a magnetic field from a magnetic recording medium, the MR element being prevented from being broken down due to ESD/EOS wit not coating of the ABS surface of the MR head.

The above object can be attained by providing an MR head using an MR element as a magnetic detector and having head elements formed on a substrate, comprising:

a capacitor connected in parallel to the MR element;

the substrate being made of a conductive material to serve as one of electrodes forming the capacitor.

In this MR head, since the capacitor is connected in parallel to the MR element, if an external electric charge applies a high voltage to the MR element, a current flows mainly to the capacitor side. Therefore, even if an electric charge flows in from outside, no overcurrent will flow to the MR element. That is, the capacitor connected in parallel to the MR element in the MR head effectively acts to prevent any overcurrent from flowing to the MR element.

Further, in the MR head, the substrate on which the head elements are formed is used as one of the electrodes of the capacitor to prevent an overcurrent from flowing to the MR head. By using the substrate as the electrode of the capacitor, it is possible to set the capacity of the capacitor relatively freely. By setting the capacitor capacity sufficiently large, the MR element can be prevented almost completely from being broken down due to ESD/EOS since most of an electric charge developed when the MR element is applied with a very high voltage will flow to the capacitor side.

By using the substrate as the electrode of the capacitor to prevent the MR element from being damaged due to ESD/EOS, it is possible to form the capacitor at an earlier stage than the stage of forming the head element in the MR head manufacturing process. Thus by forming, at the earlier stage than the forming of the head element, the capacitor to prevent the MR element from being damaged due to ESD/EOS, it is possible to prevent the MR element from being broken down due to ESD/EOS even in the course of the MR head being manufactured.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
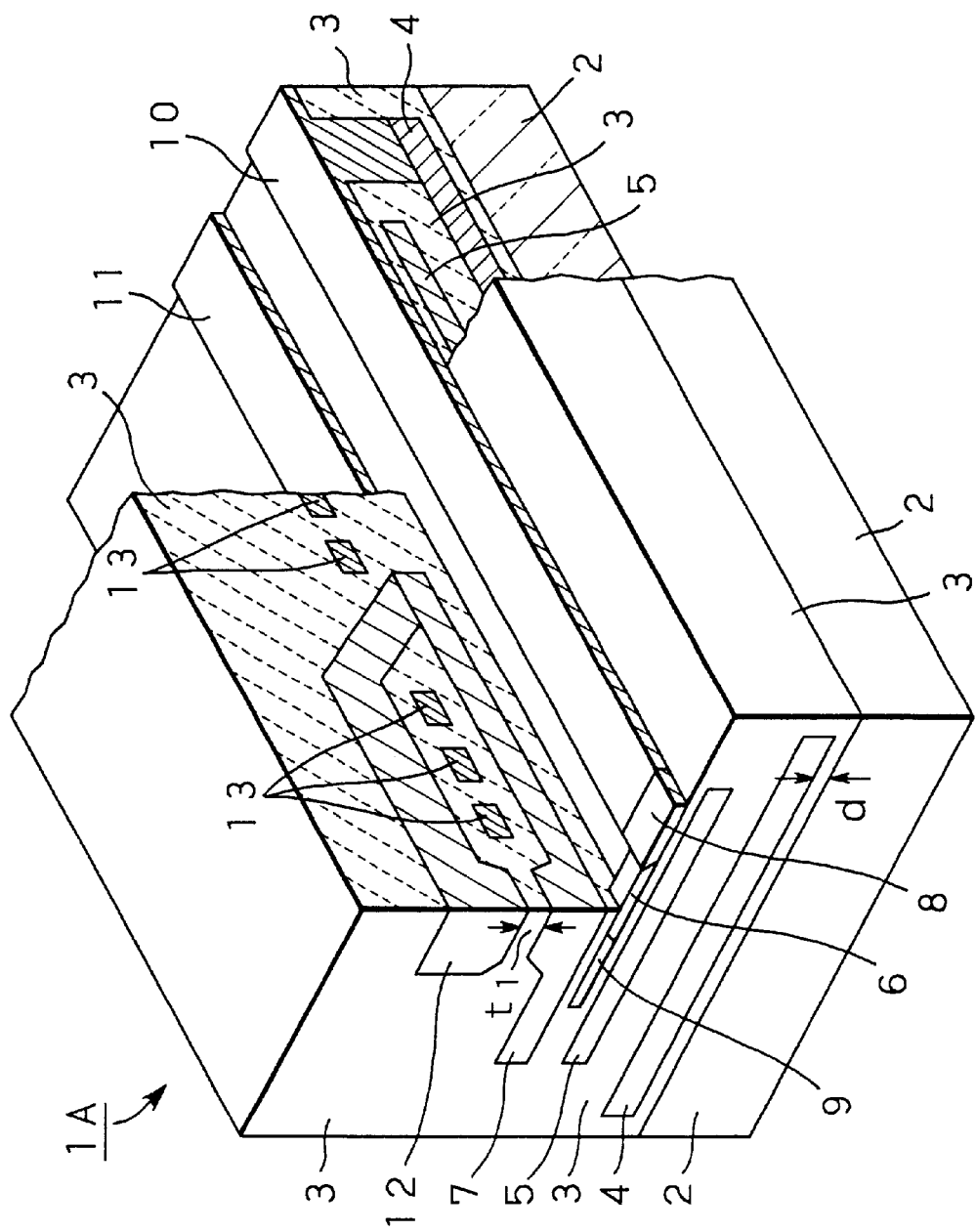
FIG. 1 is a partially fragmentary perspective view of one embodiment of the. magnetic head comprising the MR head according to the present invention.
Figure 2:
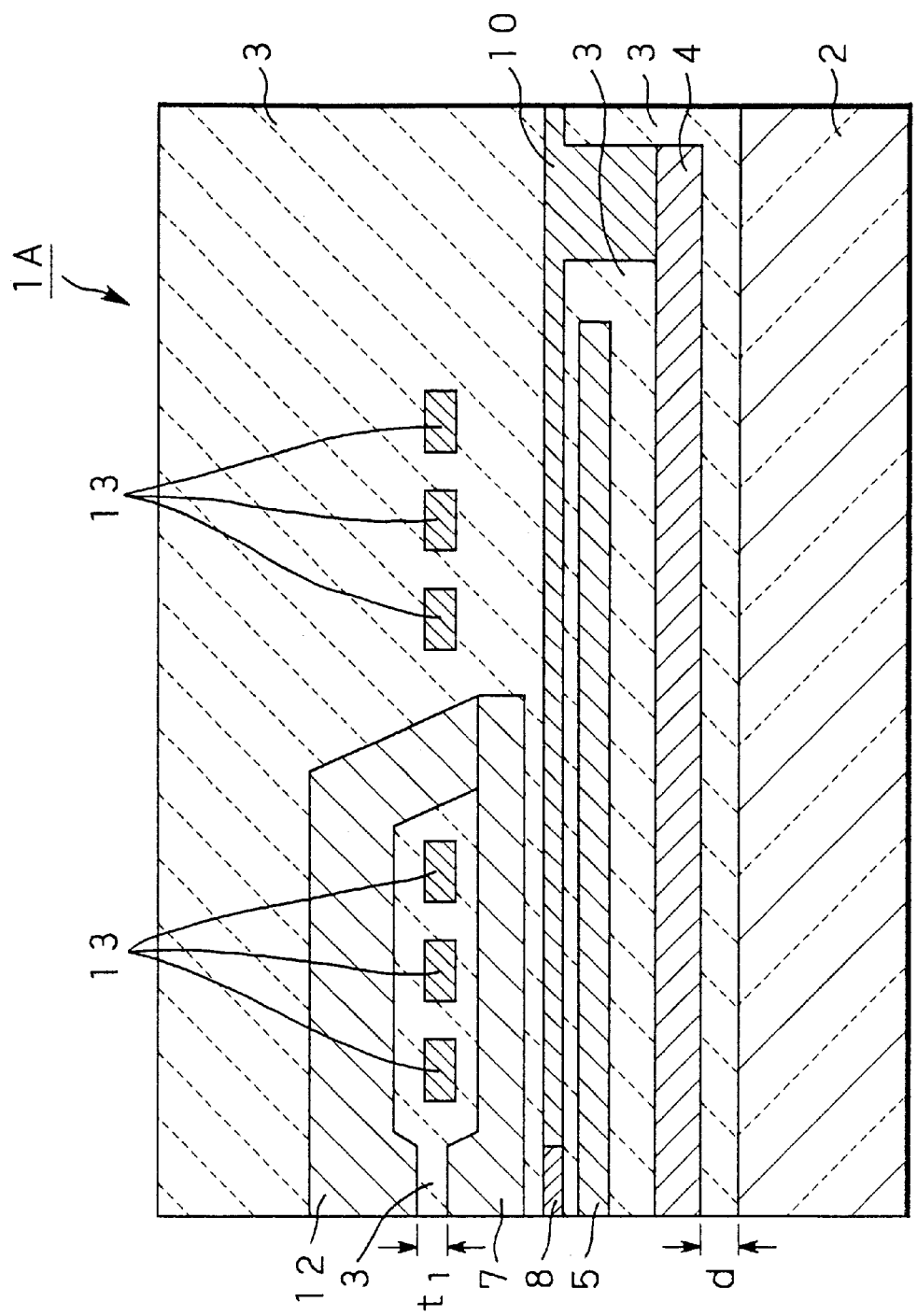
FIG. 2 is a sectional view of the magnetic head in FIG. 1, taken along a plane through a first conductor.

First embodiment:

Referring now to FIGS. 1 and 2, there is illustrated a first embodiment of the magnetic head comprising the MR head according to the present invention. FIG. 1 is a perspective view of a magnetic head 1A as the first embodiment with some portions thereof cut away for easier understanding of the internal structure of the magnetic head 1A, and FIG. 2 is a sectional view of the magnetic head 1A in FIG. 1.

The magnetic head 1A is intended for use in a hard disc drive. It comprises a substrate 2 made of a conductive material and on which the MR head according to the present invention is formed, and an inductive magnetic head formed on the MR head. The MR head works as a read head while the inductive magnetic head works as a write head.

The MR head is a so-called shielded MR head, and comprises an insulative layer 3 formed on the substrate 2, a conductive layer 4 formed on the insulative layer 3, a first magnetic shield 5 formed on the conductive layer 4 via the insulative layer 3, an MR element 6 formed on the first magnetic shield 5 via the insulative layer 3, and a second magnetic shield 7 formed on the MR element 6 via the insulative layer 3.

The substrate 2 is made of a conductive material such as $Al_2O_3$—TiC or the like. The substrate 2 is connected to a ground potential during the process of manufacturing the magnetic head 1A and when the magnetic head 1A is built into a hard disc drive or the like.

The insulative layer 3 is made of an insulative material such as $Al_2O_3$, $SiO_2$ or the like. Although the layer configuration of the insulative layer 3 is not shown in FIGS. 1 and 2, since the layers forming together the magnetic head 1A are formed, one on another, on the substrate 2, the insulative layer 3 is composed of a plurality of layers in practice.

The conductive layer 4 is made of a conductive material such as Cr, Ti, Ta, W, Mo, Cu or an alloy of them. The conductive layer 4 is disposed opposite the substrate 2 via the insulative layer 3. Thus, the conductive layer 4 and substrate 2 form together a capacitor.

The capacity of the capacitor formed from the substrate 2 and conductive layer 4 is expressed by the following relation (1):

$$C = \in \cdot S/d \tag{1}$$

where $\in$: Dielectric constant of the insulative layer 3 between the substrate 2 and conductive layer 4 d: Distance between the substrate 2 and conductive layer 4

S: Area of the conductive layer 4

Therefore, the capacity of the capacitor can be freely set by changing the distance d between the substrate 2 and conductive layer 4 and the area S of the conductive layer 4.

Note that the capacity of the capacitor should desirably be set sufficiently large to prevent the MR element 6 from being broken down due to ESD/EOS. Therefore, the distance d between the substrate 2 and conductive layer 4 should preferably be as small as possible to such an extent that no dielectric breakdown will take place. Also, the area S of the conductive layer 4 should preferably be as large as possible. The area S of the conductive layer 4 can be increased up to the area of the flat top of the substrate 2.

Note that if the area S of the conductive layer 4 is made as large as that of the flat top of the substrate 2, the conductive layer 4 will be exposed at the lateral side of the magnetic head 1A. From the standpoint of preventing a short-circuit at the lateral side of the magnetic head 1A, the conductive layer 4 should not preferably be exposed at the lateral side of the magnetic head 1A. Therefore, the conductive layer 4 should preferably have a largest possible area S within such a range in which it will not be exposed at the lateral side of the magnetic head 1A.

The first magnetic shield 5 is formed on the conductive layer 4 via the insulative layer 3. The first magnetic shield 5 magnetically shields the layers under the MR element 6. It is made of a soft-magnetic material such as Ni—Fe or the like. The MR element 6 is formed on the first magnetic shield 5 via the insulative layer 3.

The MR element 6 is an element of which the resistance varies depending upon the magnitude of an external magnetic field. It is formed, for example, from a Ta layer, NiFeNb layer, Ta layer, NiFe layer and a Ta layer formed in this order one on another by sputtering. Of this MR element 6 thus constructed, the NiFe layer being a so-called soft adjacent layer (SAL) having a magnetoresistance effect, serves as a magnetic detector. The NiFeNb layer is also a SAL layer to apply a vertical bias magnetic field to the NiFe layer. Note that the ME element 6 may not always be constructed as in the above but it may be suitably constructed as necessary according to a requirement for the magnetic reading system. Namely, an MR element showing a so-called giant magnetoresistance (GMR) effect may be used.

The MR element 6 is shaped to have a rectangular form and one lateral side thereof is exposed opposite a magnetic recording medium. The MR element 6 has disposed at opposite ends thereof permanent magnets 8 and 9, respectively, to apply a horizontal bias magnetic field to the MR element 6.

The permanent magnets 8 and 9 are provided to apply the horizontal bias magnetic field to the MR element 6 in order to stabilize the operation of the MR element 6. They should preferably be made of a hard-magnetic material having a large coercive force, more particularly, CoNiPt, CoCrPt or the like.

The permanent magnet 8 disposed in contact with one end of the MR element 6 has a first conductor 10 connected thereto, and the permanent magnet 9 disposed in contact with the other end of the MR element 6 has a second conductor 11 connected thereto. These conductors 10 and 11 are provided to supply a sense current to the MR element 6. They are made of Cr, Ti, Ta, W, Mo, Cu or an alloy of them, for example.

An end of the first conductor 10, connected to the permanent magnet 8, is formed to be buried in the insulative layer 3 and the other end is formed to be exposed out. The exposed portion serves as a first terminal of the MR element 6 for connection to outside. When a magnetic signal is read from a magnetic recording medium by the magnetic head, a sense current will be supplied to the MR element 6 from the first external connection terminal of the via the first conductor 10.

Similarly, an end of the second conductor 11, connected to the permanent magnet 9, is formed to be buried in the insulative layer 3 and the other end is formed to be exposed out. The exposed portion serves as a second terminal of the MR element for connection to outside. The second external connection terminal is connected to a ground potential when a magnetic signal is read from a magnetic recording medium by the magnetic head.

Also, the insulative layer 3 is formed under the first conductor 10, and has formed therein an opening through which the first conductor 10 is connected to the conductor layer 4. In other words, the conductive layer 4 of this MR head is electrically connected to one end of the MR element 6. It should be noted that the second conductor 11 is not connected to the conductive layer 4.

The second magnetic shield 7 is formed, via the insulative layer 3, on the MR element 6, permanent magnets 8 and 9 and the conductors 10 and 11. The second magnetic shield 7 magnetically shields the layers on the MR element 6. It is made of a soft-magnetic material such as Ni—Fe or the like. Note that in addition to the function to magnetically shield the layers on the MR element 6, the second magnetic shield 7 serves also as a magnetic core of the inductive magnetic head formed on the MR head.

The inductive magnetic head formed on the MR head comprises a magnetic core formed from the second magnetic shield 7 and upper core 12, and a thin-film coil 13 wound on the magnetic core.

The upper core 12 forms together with the second magnetic shield 12 a closed magnetic circuit to serve as the magnetic core of the inductive magnetic head. It is made of a soft-magnetic material such as Ni—Fe or the like. The second magnetic shield 7 and upper core 12 have front ends thereof exposed opposite a magnetic recording medium, and they are in contact with each other at the rear ends thereof. Note that the second magnetic shield 7 and upper core 12 have the front ends thereof formed to provide a predetermined gap t1 between them and opposite the magnetic recording medium.

More specifically, in the magnetic head 1A, the second magnetic shield 7 magnetically shields the upper layers on the MR element 6 and also serves as the magnetic core of the inductive magnetic head, and the second magnetic shield 7 and upper core 12 form together the magnetic core of the inductive magnetic head. The gap t1 formed between the second magnetic shield 7 and upper core 12 and opposite the magnetic recording medium provides a recording magnetic gap of the inductive magnetic head.

In addition, the second magnetic shield 7 has formed thereon the thin-film coil 13 buried in the insulative layer 3.

The thin-film coil 13 is wound on the magnetic core formed from the second magnetic shield 7 and upper core 12. Either end of the thin-film coil 13 is exposed out (not shown). A terminal is formed on either end of the thin-film coil 13 to serve as a terminal of the inductive magnetic head for connection to outside. That is, when the magnetic head writes a magnetic signal to a magnetic recording medium, the thin-film coil 12 will be supplied with a write current from these external connection terminals.

In the magnetic head 1A constructed as mentioned above, the capacitor formed from the substrate 2 and conductive layer 4 works to prevent an overcurrent from flowing to the MR element 6. This will further be described with reference to FIG. 3 showing an equivalent circuit of the MR head.

Figure 3:
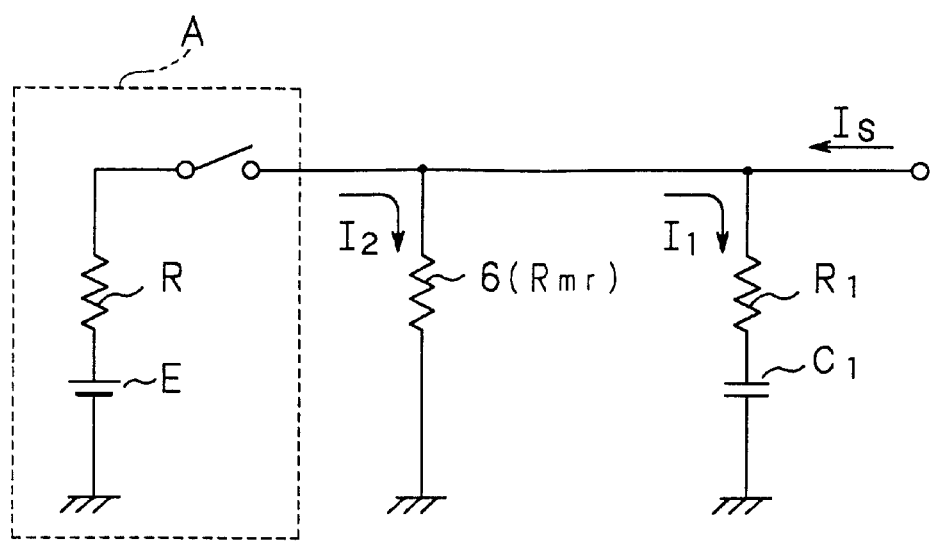
FIG. 3 is an illustration of an equivalent circuit of the MR head included in the MR head in FIG. 1.

Note that in FIG. 3, the dash-line block indicated with a reference A denotes an electric charge source which will be a factor to break down the MR element 6. More specifically, the electric charge source is modeled by a DC source E and resistor R.

As shown in FIG. 3, one end of the MR element 6 is connected to an external circuit. When the MR head is driven, a sense current $I_S$ is supplied to the MR element 6 from the external circuit. Note that of the ends of the MR element 6, one to which the first conductor 10 is connected is connected to the external circuit to which the first external connection terminal is also connected. The other end of the MR element 6 is connected to a ground potential via the second conductor 11. That is, the second external connection terminal is connected to a ground potential.

In this MR head, a capacitor $C_1$ formed from the substrate 2 and conductive layer 4 is connected in parallel to the MR element 6 at the side of the MR element 6 to which the first conductor 10 is connected. Note that the side of the capacitor $C_1$ connected to the MR element 6 corresponds to the conductive layer 4. On the other hand, the side of the capacitor $C_1$ not connected to the MR element 6 corresponds to the substrate 2, and connected to a ground potential. In FIG. 3, a resistor $R_1$ is a resistor connected between the MR element 6 and conductive layer 4 (namely, the resistor of the first conductor 10).

Practically, a parasitic capacity takes place in the MR element 6 as well, but since it is very small as compared with the capacity of the capacitor $C_1$ formed from the substrate 2 and conductive layer 4, it will be ignored here and will not be described any longer.

A current $I_1$ flowing to the capacitor C1 when an electric charge flows in from the electric charge source indicated with the reference A in FIG. 3, is expressed by the following relation (2), and a current $I_2$ flowing to the MR element 6 at such a time is expressed by the following relation (3):

$$I_1 = \frac{R_{mr}E}{F} e^{-\frac{(R_{mr}+R_1)t}{C_1 F}} \quad (2)$$

$$I_2 = \frac{E}{R_{mr}+R}\left(1 - \frac{R_{mr}R}{F}\right) e^{-\frac{(R_{mr}+R_1)t}{C_1 F}} \quad (3)$$

where $F=RR_1+R_1R_{mr}+R_{mr}R$.

As seen from the relations (1) and (2), the current $I_1$ flowing to the capacitor $C_1$ and the current $I_2$ flowing to the MR element 6 vary according to a certain time constant. More specifically, when an electric charge flows in from the electric charge source, the current $I_1$ flowing to the capacitor $C_1$ and that $I_2$ flowing to the MR element 6 vary as shown in FIG. 4.

Figure 4:
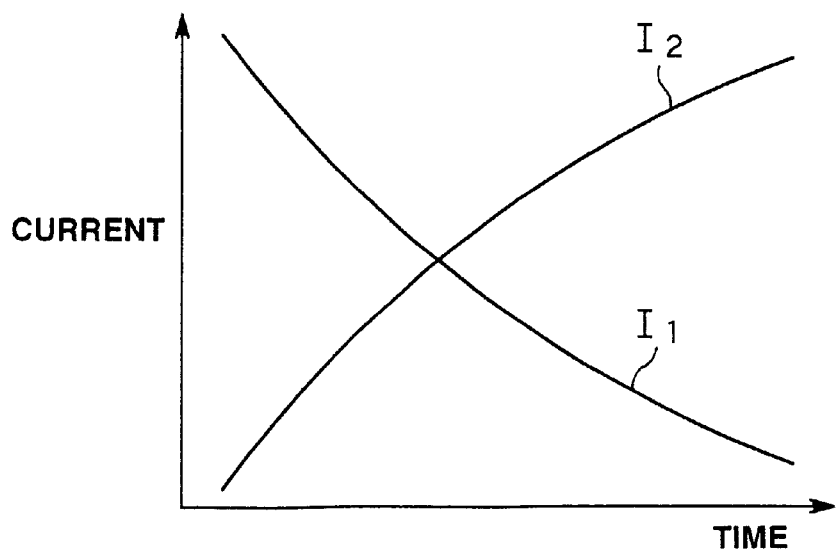
FIG. 4 graphically shows the time changes of a current $I_1$ flowing to a capacitor composed of a substrate and conductive layer and a current $I_2$ flowing to the MR element side, when an external electric charge flows into the MR head.

As seen from FIG. 4, initially after the electric charge flows into the MR head from the electric charge source, a current will flow to the capacitor $C_1$ composed of the substrate 2 and conductive layer 4 while little current will flow to the MR element 6.

The breakdown of the MR element due to ESD/EOS. will take place when applied with a high voltage momentarily. So, the DC source E is in effect a power source having a certain time constant. Therefore, if the capacitor $C_1$ has a sufficient capacity and a sufficiently large time constant, little current will flow to the MR element 6.

In the above-mentioned MR head, the capacity of the capacitor $C_1$ can freely be set by changing the distance d between the substrate 2 and conductive layer 4 forming together the capacitor $C_1$ and the area S of the conductive layer 4 as previously described. If the capacity of the capacitor $C_1$ is set so that the capacitor $C_1$ has a sufficiently large time constant against an electric charge flowing in from outside, little current will flow to the MR element 6 even if an external electric charge flows in. Thus, the MR element 6 will not be broken down.

When a charge cumulated in the capacitor $C_1$ flows into the MR element 6, it may possibly break down the MR 6. However, since there is provided the resistor $R_1$ between the MR element 6 and capacitor $C_1$ in practice, the power is consumed by the resistor $R_1$ so that the charge in the capacitor $C_1$ will not heavily damage the MR element 6.

As having been described in the above, in the MR head, when an electric charge flows in from outside, it will be cumulated in the capacitor $C_1$ composed of the substrate 2 and conductive layer 4, so the MR element 6 will not possibly be broken down.

In the magnetic head 1A, the conductive layer 4 is formed before the MR element 6 is formed in forming the MR head on the substrate 2. Thus, a path to escape a current when an external electric charge flows already exists before the MR element 6 is formed. Therefore, the magnetic head 1A has such a construction that the MR element 6 can be prevented from being broken down due to ESD/EOS throughout the process of manufacturing the magnetic head 1A.

Figure 5:
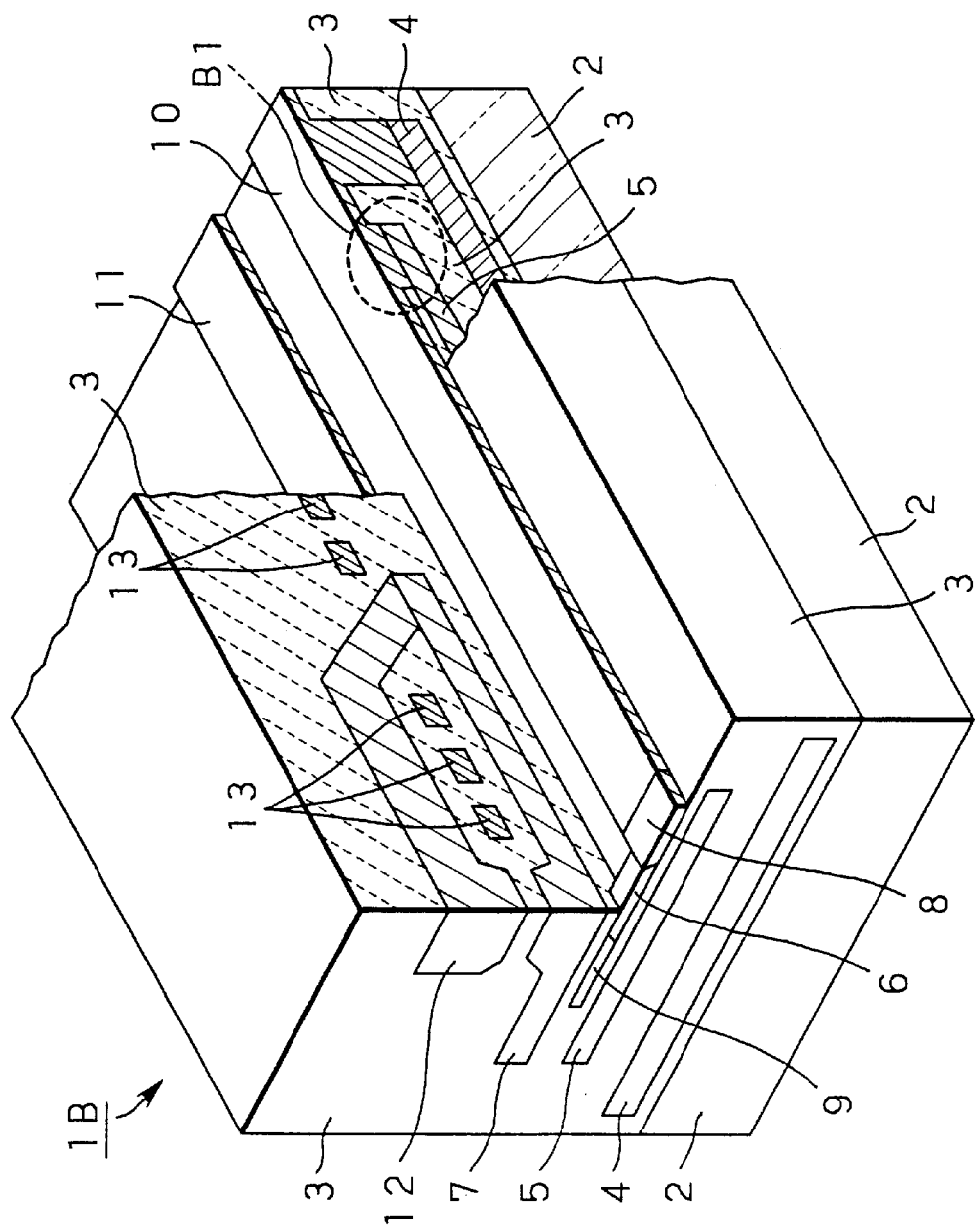
FIG. 5 is a partially fragmentary perspective view of another embodiment of the magnetic head comprising the MR head according to the present invention.

Second embodiment:

Referring now to FIG. 5, there is illustrated a second embodiment of the magnetic head comprising the MR head according to the present invention. The magnetic head is generally indicated with a reference 1B. FIG. 5 is a perspective view of a magnetic head 1B as the second embodiment with some portions thereof cut away for easier understanding of the internal structure of the magnetic head 1B. In FIGS. 5 and 6 to 11, similar or same elements as in FIGS. 1 and 2 are indicated with similar or same references, and will not further be described herebelow.

The magnetic head 1B shown in FIG. 5 has formed in the insulative layer 3 formed under the first conductor 10 an opening through which the first conductor 10 is connected to the first magnetic shield 5. Note that in FIG. 5, a portion where the first conductor 10 and first magnetic shield 5 are connected to each other is shown as enclosed in a circle B1.

In this magnetic head 1B, the conductive layer 4, first magnetic shield 5 and MR element 6 have a same potential, so that the MR element 6 can more effectively be prevented from being broken down due to ESD/EOS.

Figure 6:
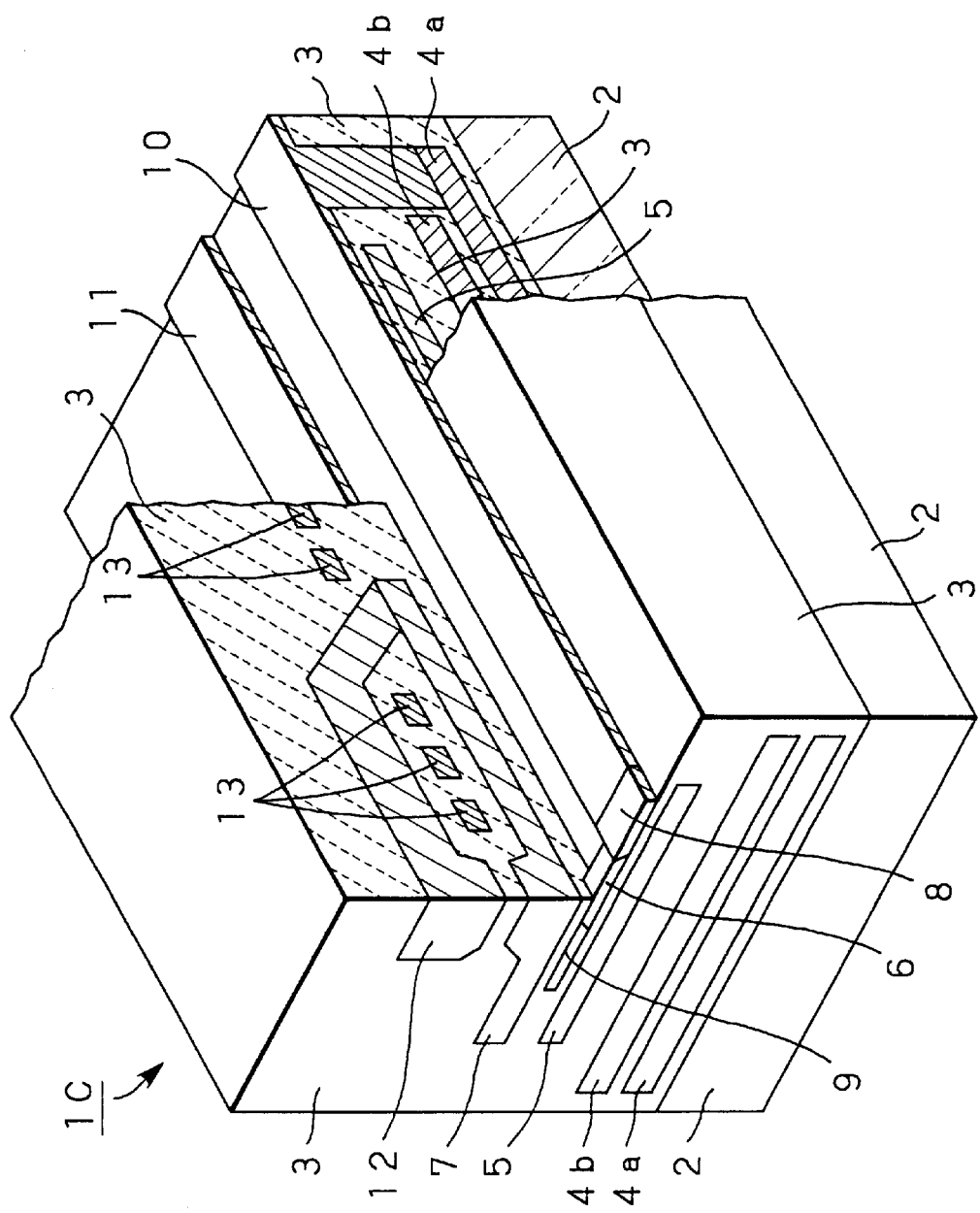
FIG. 6 is a partially fragmentary perspective view of a still another embodiment of the magnetic head comprising the MR head according to the present invention.
Figure 7:
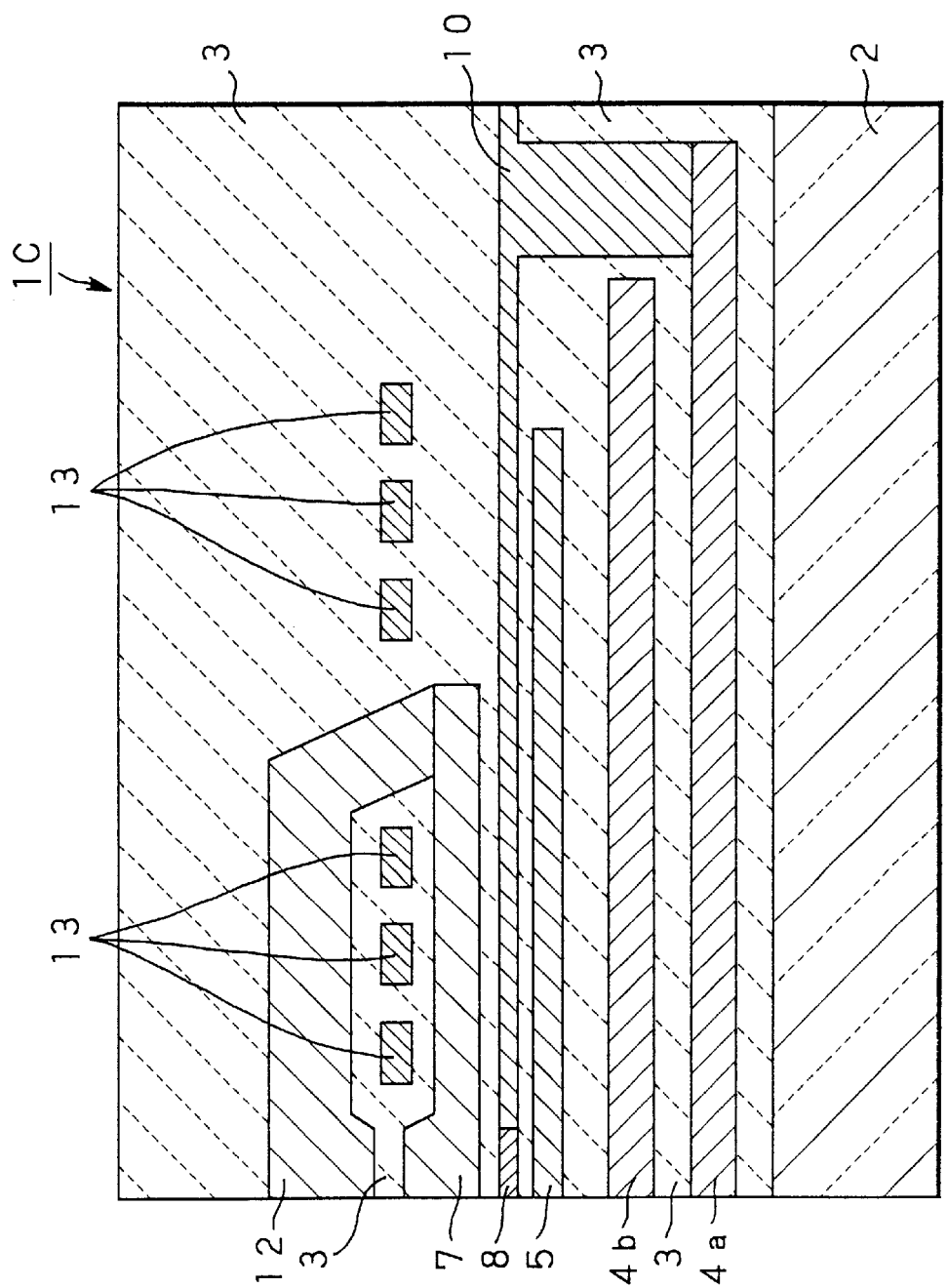
FIG. 7 is a sectional view of the magnetic head in FIG. 6, taken along a plane through a first conductor.
Figure 8:
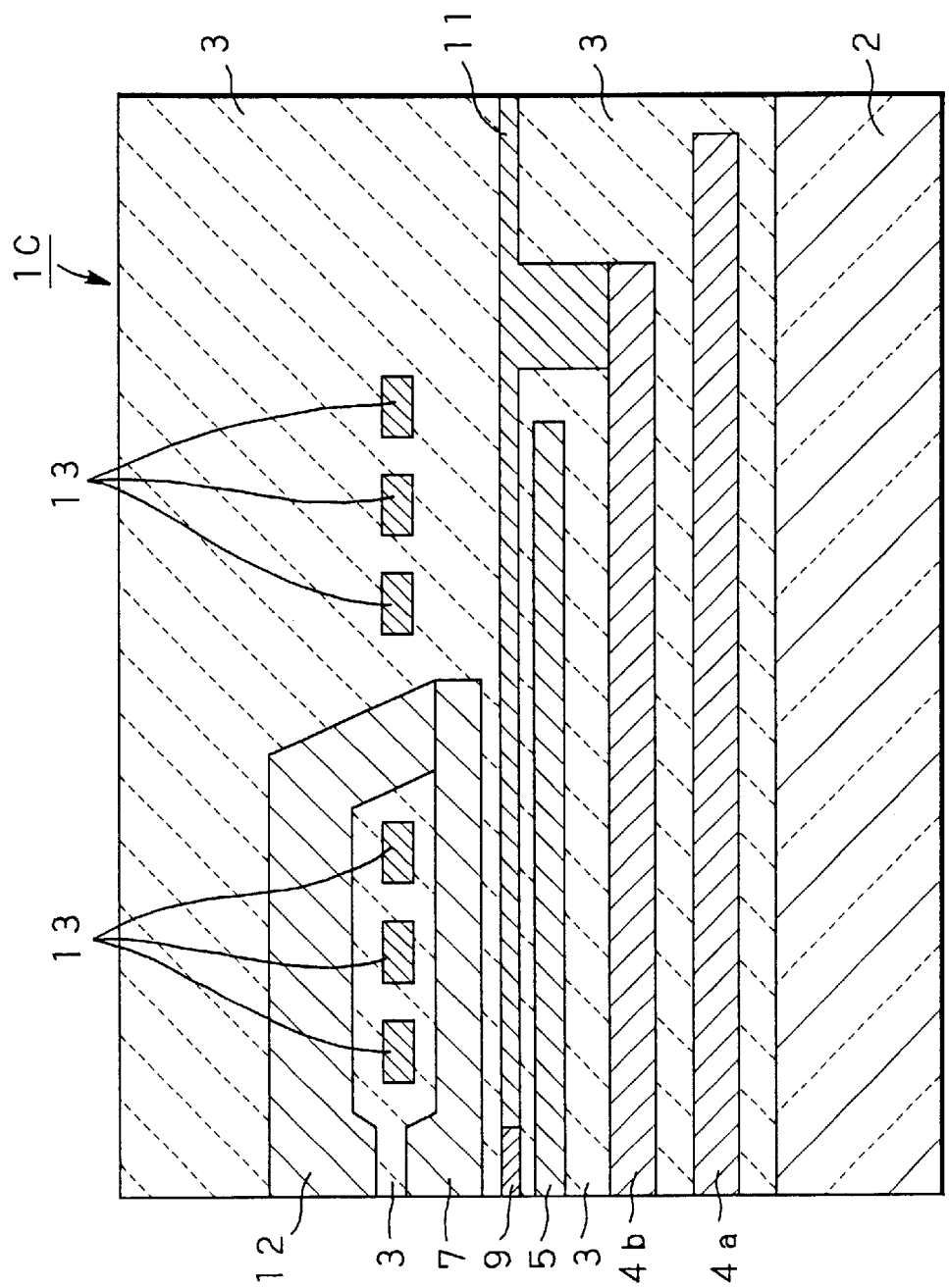
FIG. 8 is a sectional view of the magnetic head in FIG. 6, taken along a plane through a second conductor.

Third embodiment:

Referring now to FIGS. 6 to 8, there is illustrated a third embodiment of the magnetic head comprising the MR head according to the present invention. The magnetic head is generally indicated with a reference 1C. FIG. 6 is a perspective view of a magnetic head 1C as the third embodiment with some portions thereof cut away for easier understanding of the internal structure of the magnetic head 1C.

FIG. 7 is a sectional view of the magnetic head 1C, taken along a plane through the first conductor 10, and FIG. 8 is a sectional view of the magnetic head 1C, taken along a plane through the second conductor 11.

The magnetic head 1C shown in FIGS. 6 to 8 comprises a first conductive layer 4a formed on the substrate 2 via the insulative layer 3, and a second conductive layer 4b formed on the first conductive layer 4a via the insulative layer 3. The first magnetic shield 5 is formed on the second conductive layer 4b via the insulative layer 3. In other words, the magnetic head 1C comprises the first and second conductive layers 4a and 4b in place of the conductive layer 4 in the magnetic head 1A shown in FIGS. 1 and 2.

As shown in FIGS. 6 and 7, the magnetic head 1C has formed in the insulative layer 3 formed under the first conductor 10 an opening through which the first conductor 10 is connected to the first conductive layer 4a. In other words, in the MR head included in the magnetic head 1C, the first conductive layer 4a is electrically connected to one end of the MR element 6. Note that the second conductor 11 is not connected to the first conductive layer 4a.

As shown in FIG. 8, there is formed in the insulative layer 3 formed under the second conductor 11 an opening through which the second conductor 11 is connected to the second conductive layer 4b. In other words, the second conductive layer in this MR head is electrically connected to the other end of the MR element 6. Note that the first conductor 10 is not connected to the second conductive layer 4b.

In the magnetic head 1C, the substrate 2 and first conductive layer 4a form together a capacitor, while the first and second conductive layers 4a and 4b also form together another capacitor. It is assumed here that the capacitor formed from the substrate 2 and first conductive layer 4a has a capacity Ca, while that formed from the first and second conductive layers 4a and 4b has a capacity Cb.

In this case, the capacitors are connected in parallel to each other, and thus their total capacity C is Ca+Cb. Therefore, the capacity of the capacitors in this magnetic head 1C can be made larger than in the magnetic heads 1A and 1B to more effectively prevent the MR element from being broken down due to ESD/EOS. Namely, the two conductive layers 4a and 4b form together the capacitors to assure that the breakdown of the MR element due to ESD/EOS will more hardly take place.

Figure 9:
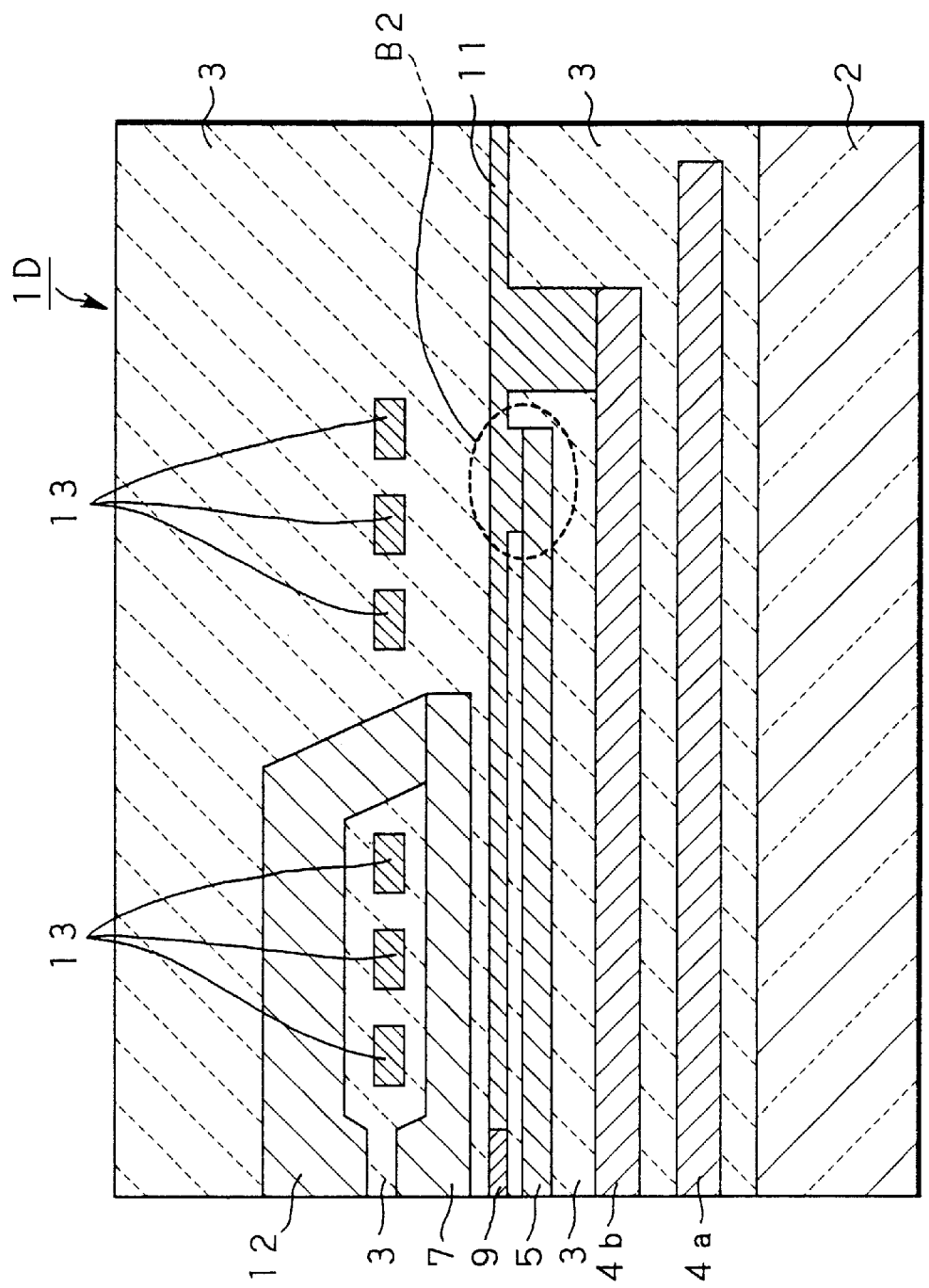
FIG. 9 is a sectional view of a yet another embodiment of the magnetic head comprising the MR head according to the present invention, taken along the plane through the second conductor.

Fourth embodiment:

Referring now to FIG. 9, there is illustrated a fourth embodiment of the magnetic head comprising the MR element according to the present invention. The magnetic head is generally indicated with a reference 1D. FIG. 9 is a sectional view of the fourth embodiment of the magnetic head 1D, taken along the plane through the second conductor 11. In FIG. 9, similar or same elements as in FIGS. 6 to 8 are indicated with similar or same references, and will not further be described herebelow.

The magnetic head 1D shown in FIG. 9 has formed in the insulative layer 3 formed under the second conductor 11 an opening through which the second conductor 11 is connected to the first magnetic shield 5. Note that in FIG. 9, a portion where the second conductor 11 and first magnetic shield 5 are connected to each other is shown as enclosed in a circle B2.

In this magnetic head 1D, the second conductive layer 4b, first magnetic shield 5 and MR element 6 have a same potential, so that the MR element 6 can more effectively be prevented from being broken down due to ESD/EOS.

Figure 10:
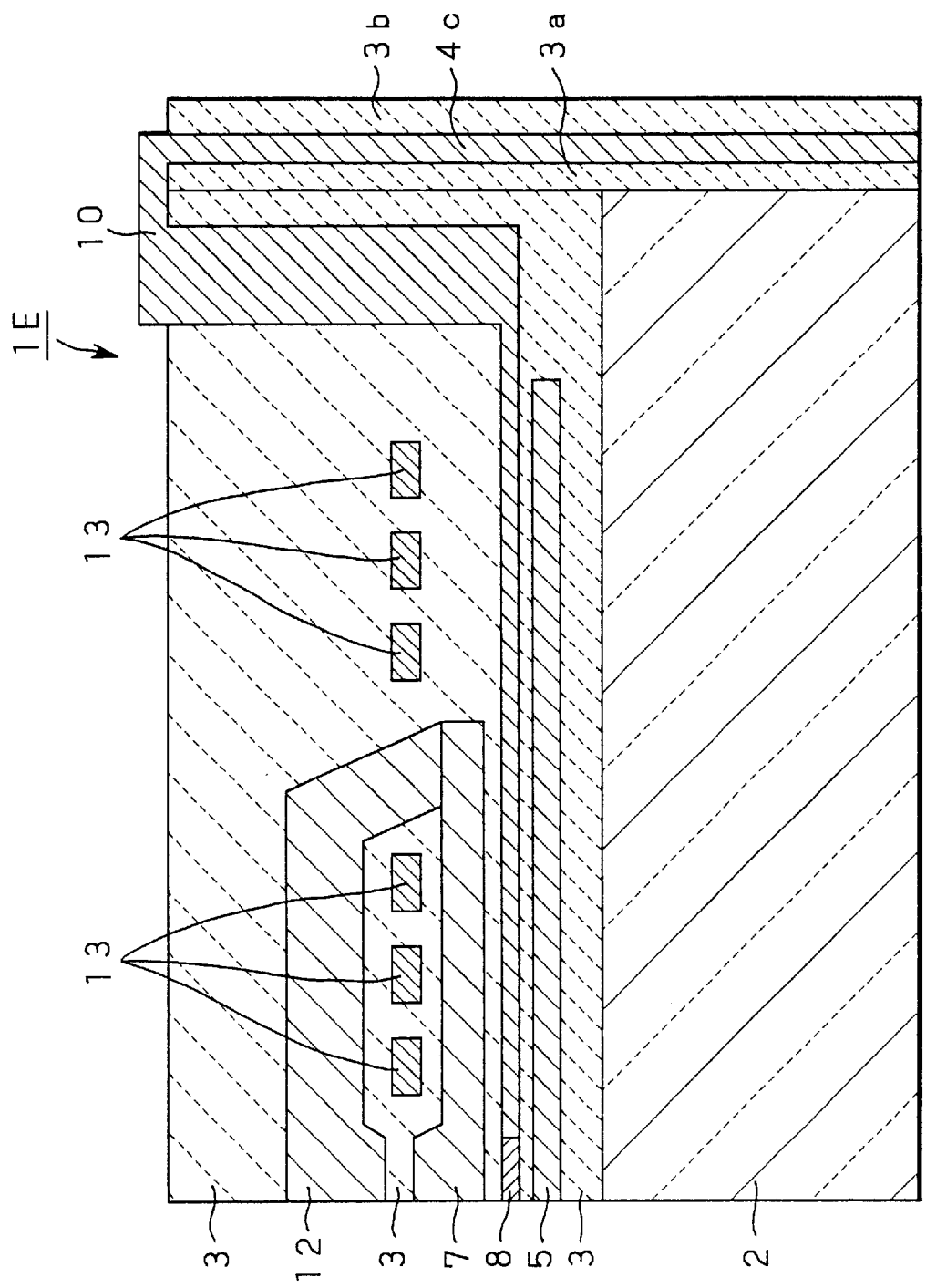
FIG. 10 is a sectional view of a still yet another embodiment of the MR head comprising the MR element according to the present invention.
Figure 11:
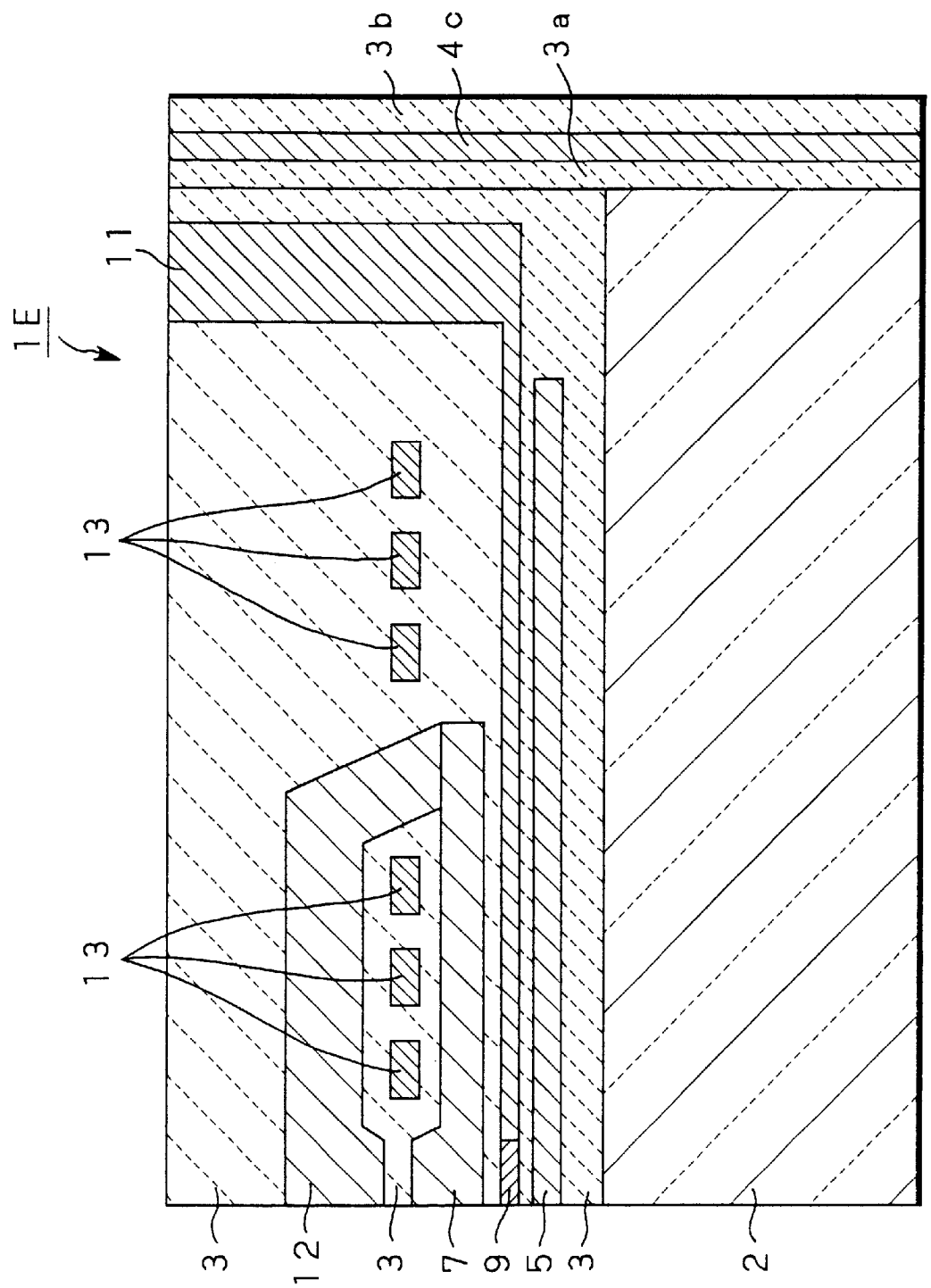
FIG. 11 is a sectional view of the magnetic head in FIG. 10, taken along the plane through the second conductor.

Fifth embodiment:

Referring now to FIGS. 10 and 11, there is illustrated a fifth embodiment of the magnetic head comprising the MR element according to the present invention. The magnetic head is generally indicated with a reference 1E. FIG. 10 is a sectional view of the magnetic head 1E, taken along a plane through the first conductor 10, and FIG. 11 is a sectional view of the magnetic head 1E, taken along a plane through the second conductor 11.

The magnetic head 1E has a conductive layer 4c formed, via an insulative layer 3a, on the side thereof opposite to that facing a magnetic recording medium, and an insulative layer 3b formed on the conductive layer 4c.

As shown in FIG. 10, the magnetic head 1E has formed on the first conductor 10 the insulative layer 3 having formed therein an opening through which the first conductor 10 is exposed out. This portion is used as a first external connection terminal. As shown in FIG. 11, the insulative layer 3 is formed also on the second conductor 11. The insulative layer 3 has formed therein an opening through which the second conductor 11 is exposed out. This portion is used as a second external connection terminal.

In the magnetic head 1E, the conductive layer 4c formed, via the insulative layer 3a, on the side of the magnetic head 1E opposite to that facing a magnetic recording medium, is connected to the first conductor 10 as shown in FIG. 10. In other words, the conductive layer 4c in the MR head is electrically connected to one end of the MR element 6. It should be noted that as shown in FIG. 11, the second conductor 11 is not connected to the conductive layer 4c.

In this magnetic head 1E, the conductive layer 4c formed, via the insulative layer 3a, on the side of the magnetic head 1E opposite to that facing a magnetic recording medium, and the substrate 2 form together a capacitor to prevent the breakdown of the MR element 6 due to ESD/EOS. This configuration is especially suitable for use when the substrate 2 is thick and the area of the flat top of the substrate 2 is larger than that of the side of the magnetic head opposite to that facing a magnetic recording medium.

In the foregoing, the present invention has been described concerning the five nonlimitative embodiments of the magnetic head comprising the MR head according to the present invention. That is, the MR head according to the present invention is characterized in that the substrate on which the head elements are formed is used as an electrode of the capacitor to prevent the breakdown of the MR element due to ESD/EOS, and the present invention is not limited to other respects included in the aforementioned embodiments. Therefore, a conductive layer may be formed on the bottom surface of the substrate (namely, where no head elements are formed) via the insulative layer to form a capacitor which prevents the MR element from being damaged due to ESD/EOS.

As having been described in detail in the foregoing, the MR head according to the present invention has the capacitor connected in parallel to the MR element so that when an external electric charge flows in to apply a high voltage to the MR element, the electric charge will flow into the capacitor. Therefore, in the MR head according to the present invention, even when an electric charge flows in from outside, no overcurrent will flow to the MR element. Thus, the MR element of the MR head according to the present invention is hardly broken down due to ESD/EOS.

Moreover, the MR head according to the present invention adopts the substrate as an electrode forming the capacitor so that the capacity of the capacitor can be set relatively freely. Therefore, in this MR head of the present invention, the capacity of the capacitor to prevent the breakdown of the MR element due to ESD/EOS can be set sufficiently large, thus permitting to almost perfectly prevent the MR element from being damaged due to ESD/EOS.

Further to the above, since the MR head according to the present invention adopts the substrate as an electrode forming the capacitor, it is possible to form, before the head elements are formed in the process of manufacturing the MR head, the capacitor intended to prevent the breakdown of the MR element due to ESD/EOS. Therefore, according to the present invention, the MR element can be prevented from being broken down in the MR head manufacturing process.

What is claimed is:

1. A magnetoresistive head using a magnetoresistive element as a magnetic detector and having head elements formed on a substrate, comprising:

a capacitor connected in parallel to the magnetoresistive element;

the substrate being made of a conductive material to serve as one of electrodes forming the capacitor;

a conductive layer formed on the substrate via an insulative layer;

the conductive layer to serve as a second of electrodes forming the capacitor; and a first magnetic shield layer formed on the conductive layer via the insulative layer;

the magnetoresistive element being formed on the first magnetic magnetic shield via the insulative layer.

2. The magnetoresistive head as set forth in claim 1, further comprising:

a second magnetic shield formed on the magnetoresistive element via the insulative layer;

the insulative layer being electrically connected to one end of the magnetoresistive element.

3. The Magnetoresistive head as set forth in claim 2, wherein the first magnetic shield is electrically connected to the conductive layer.

* * * * *